US012616212B2

(12) United States Patent
Van Blokland

(10) Patent No.: US 12,616,212 B2
(45) Date of Patent: May 5, 2026

(54) METHOD AND DEVICE FOR APPLYING A PREFORMED PORTIONED MALLEABLE MASS

(71) Applicant: Radie B.V., Culemborg (NL)

(72) Inventor: Johannes Josephus Antonius Van Blokland, Culemborg (NL)

(73) Assignee: Radie B.V., Culemborg (NL)

( * ) Notice: Subject to any disclaimer, the term of this patent is extended or adjusted under 35 U.S.C. 154(b) by 0 days.

(21) Appl. No.: 18/433,714

(22) Filed: Feb. 6, 2024

(65) Prior Publication Data

US 2024/0260588 A1      Aug. 8, 2024

(30) Foreign Application Priority Data

Feb. 8, 2023   (NL) ...................................... 2034118
May 22, 2023   (NL) ...................................... 2034873

(51) Int. Cl.
A21C 9/06          (2006.01)
A23P 20/25         (2016.01)

(52) U.S. Cl.
CPC .............. A21C 9/065 (2013.01); A23P 20/25 (2016.08)

(58) Field of Classification Search
CPC ............ A21C 9/065; A23P 20/25; B65B 3/12
(Continued)

(56) References Cited

U.S. PATENT DOCUMENTS 1,701,971 A  *   2/1929  Chesson .................. A47F 1/035
                                                    222/561
5,992,687 A  *  11/1999  Hinds ........................ B65B 3/12
                                                    222/509
(Continued)

FOREIGN PATENT DOCUMENTS

CN        112273402  A    1/2021
EP         1090839  B1    4/2001
(Continued)

OTHER PUBLICATIONS

Search Report & Written Opinion dated Dec. 4, 2023, Application No. NL2034873.

*Primary Examiner* — Christopher M Afful
(74) *Attorney, Agent, or Firm* — The Dobrusin Law Firm, P.C.

(57)              ABSTRACT

The invention relates to a method and device for applying a preformed portioned malleable mass, comprising:
  a hollow space, provided with at least one closable exit opening;
  a piston that can be moved back and forth in at least a part of the hollow space with at least a directional component from and to the at least one closable exit opening and preferably in a direction directed from and towards the at least one closable exit opening, which piston is movable is between at least:
  a retracted position in which the part of the space is released by the piston; and
  an ejected position in which the part of the space is fully occupied;
  a mass supply channel for the malleable mass exit opening onto the part of the space that is released in the retracted position of the piston;
  a valve for the closable exit opening which is movable between a position closing the exit opening and a position releasing the exit opening; and
  a supply channel for a medium, such as air, under pressure, leading through the piston to a side of the piston facing the exit opening, for bringing the hollow space under medium pressure.

8 Claims, 3 Drawing Sheets

(58) Field of Classification Search
USPC .............................................................. 141/1
See application file for complete search history.

(56)                         References Cited

U.S. PATENT DOCUMENTS

| | | | |
|---|---|---|---|
| 6,360,920 | B1 | 3/2002 | Corominas |
| 2014/0144543 | A1 | 5/2014 | Koller et al. |
| 2015/0366222 | A1 | 12/2015 | Bertuzzi et al. |
| 2016/0330982 | A1* | 11/2016 | Frehn ...................... B02C 25/00 |
| 2021/0100255 | A1 | 4/2021 | Lagares Gamero |

FOREIGN PATENT DOCUMENTS

| | | | |
|---|---|---|---|
| EP | 1454529 | A2 | 9/2004 |
| ES | 2279086 | T3 | 8/2007 |
| IT | MI20100156 | A1 | 8/2011 |

* cited by examiner

METHOD AND DEVICE FOR APPLYING A PREFORMED PORTIONED MALLEABLE MASS

The present invention relates to a method and device for applying a preformed portioned malleable mass, in particular a mass for filling a dough product, such as minced meat. Methods and devices for this purpose are known in the art, for instance from US patent publications U.S. Pat. No. 5,992,687 and U.S. 2014 144 543. In these devices pistons are used to eject the mass from the device, wherein there is an aid by compressed air through the piston head for assisting to release any mass clogging to the piston head. It is also known, from Chinese patent application CN 11 2273 402 to use oil as a pressure means for releasing dough. This has nothing to do with the present invention however.

Such devices have the disadvantage that there is always a remainder of the mass on the piston, which is not hygienic and may lead to contamination that can in a further stage cause malfunctioning of the device. Additionally, it may be important that a shape of the malleable mass, dictated by the shape of the mould, is remained when releasing said mass. Sticking of the mass in the mould may have an impact on said shape, which is an unwanted effect.

It is therefore a goal of the present invention to provide a method and device that take away the above mentioned disadvantages, or at least to provide a useful alternative to the prior art.

The invention thereto proposes a device for applying a preformed portioned malleable mass, comprising a hollow space, provided with at least one closable exit opening, a piston that can be moved back and forth in at least a part of the hollow space with at least a directional component from and to the at least one closable exit opening and preferably in a direction directed from and towards the at least one closable exit opening, which piston is movable between at least a retracted position in which the part of the space is released by the piston; and an ejected position in which the part of the space is fully occupied, a mass supply channel for the malleable mass exit opening onto the part of the space that is released in the retracted position of the piston, a valve for the closable exit opening which is movable between a position closing the exit opening and a position releasing the exit opening and a supply channel for a medium, such as air, under pressure, in particular leading through the piston to a side of the piston facing the exit opening, for bringing the hollow space under medium pressure.

The hollow space functions as a mould, for forming the portion of the malleable mass into the desired form. For that purpose, it may have an inner shape that the closeable exit opening allows to add the medium to the (closed) space, prior to releasing the malleable mass. This bias pressure facilitates a quick and smooth release, but the presence of the valve also allows to form a pressurized cavity between the piston and the malleable mass which avoids the malleable mass to reach the piston and thus to stick thereto and to contaminate the piston.

For making sure that the malleable mass is completely released, at least a part of the piston is substantially form-fitting with a wall part of the space. Normally, such wall has a shape that is circumferential with respect to the piston head end. The piston may or may not be provided with scraping means or a sealing.

In a preferred embodiment, the piston is spaced from the mass supply channel in the retracted position. This allows to create a medium-filled separation between the piston head and the mass, which prevents the mass touching the piston.

The piston should be spaced apart form the mass supply channel to such extend that the medium filled separation forms a barrier that is able to withstand the malleable mass when it is supplied to the space. Such supply also implies a certain speed and pressure on the malleable mass. As a rule of thumb, the extend to which the piston is spaced from the mass supply channel is such that a part of the closed space extending between the mass supply channel and a part of the piston forming a boundary of the space is at least 10%, preferably at least 25% and more preferably at least 50% of the volume of the remainder of the closed space.

In the ejected position, the piston preferably is adjacent to the exit opening. As a result, the closed space is completely occupied by the piston which reduces or even eliminates the chance of malleable mass remaining in the space.

The valve may be formed by a slide, in particular a slide that is movable in the plane in which the exit opening extends. Although the malleable mass may touch and even adhere to the valve, this direction of movement contributes to a full release of the malleable mass and to the mass keeping its moulded shape.

The device according to the invention may be arranged for, in particular by comprising or being coupled to a controller configured for performing the steps of:
- a. Positioning the valve in the position closing the exit opening;
- b. Positioning the piston into the retracted position;
- c. Applying a medium, in particular a gas, such as air, through the supply channel;
- d. Supplying a portion of kneadable mass to the hollow space via the mass supply channel;
- e. Bringing the valve into the position releasing the exit opening;
- f. Moving the piston to the ejected position.

Herein, the medium may be applied under a superatmospheric pressure, and in particular under a higher pressure than the malleable mass is provided under. The pressure may depend on the malleable mass to be dispensed, but in general have a value between 0 and 2 bar.

To control the flow of the malleable mass in the hollow space, and especially to avoid the malleable mass touching the piston, steps c and d take place at least partly simultaneously, so that there is always a pressure barrier pushing the malleable mass when entering the hollow space.

Also steps c and f may take place at least partly simultaneously, that is, medium may still be applied during movement of the piston, so that the malleable mass is pushed ahead of the piston by the medium.

When multiple portioned malleable mass pieces are to be delivered, steps a to f may be repeated, in particular in the above indicated sequence.

The invention further relates to a method for applying a preformed portioned malleable mass, comprising the steps of:
- Supplying a portion of malleable mass to a closed hollow space;
- Applying a medium, in particular a gas, such as air, to the hollow space, such that a first side of the hollow space is filled with the portioned malleable mass and a second side of the hollow space is filled with the medium;
- Exit opening the closed hollow space at the first side where the portioned malleable mass is located;
- Pushing the portioned malleable mass out of the now opened hollow space in a direction from the second side to the first side, while still applying the medium from said same side.

In particular wherein the step of pushing takes place contactless, with the medium applied to the malleable mass from a piston head end.

The invention will now be illucidated into more detail with reference to the following figures, wherein.

Figure 1:
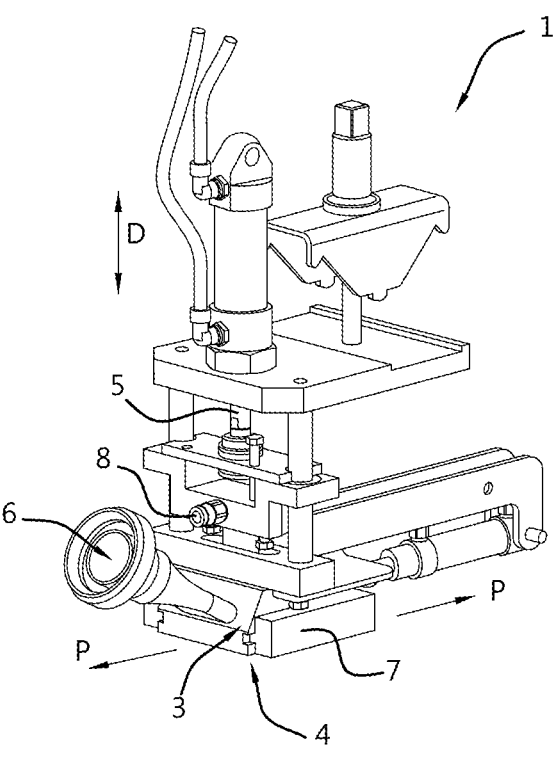
FIG. 1 shows a perspective view of a device according to the invention.
Figure 2:
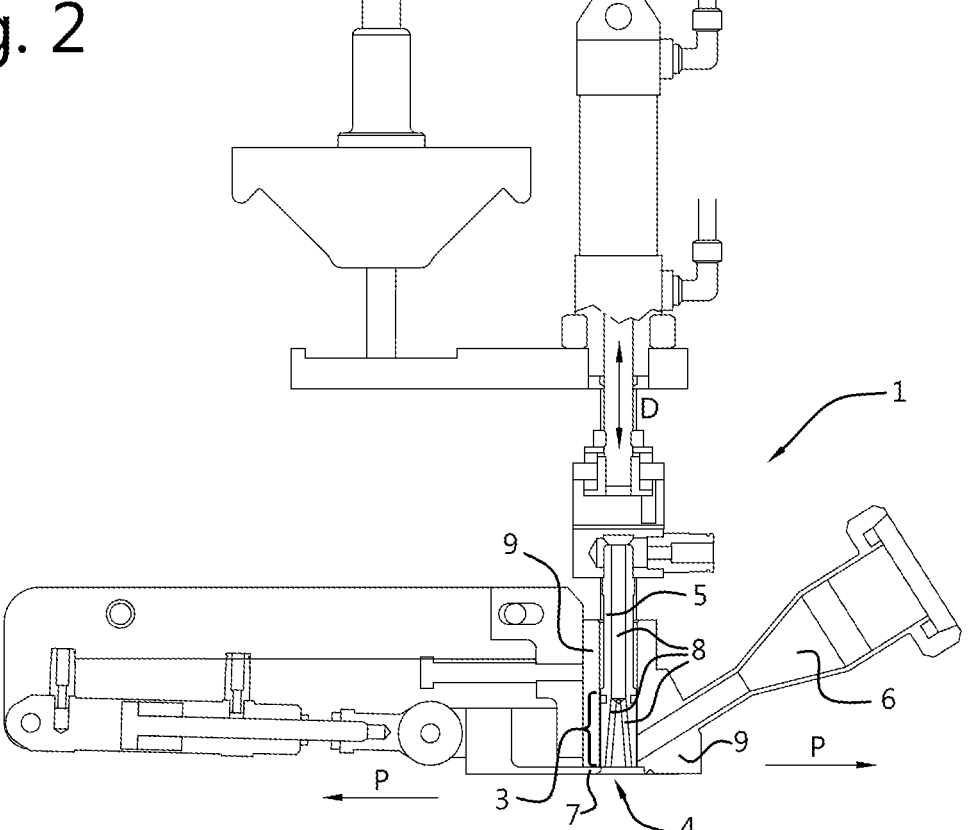
FIG. 2 shows a cross section of a device from FIG. 1.

FIGS. 3 a-d show method steps according to the invention;

FIGS. 1 and 2 shows a device 1 for applying a preformed portioned malleable mass 2 (visible in FIGS. 3 a-d), comprising a hollow space 3, provided with a closable exit opening 4, a piston 5 that can be moved back and forth in at least a part of the hollow space 3 with at least a directional component D from and to the at least one closable exit opening 4 and in the case shown in a direction D directed from and towards the at least one closable exit opening 4, which piston 5 is movable is between a retracted position (shown in FIG. 3a) in which the part of the space 3 is released by the piston 5; and an ejected position (shown in FIG. 2) in which the part of the space 3 is fully occupied by the piston 5, a mass supply channel 6 for the malleable mass opening onto the part of the space 3 that is released in the retracted position of the piston 5, a valve 7 for the closable exit opening 4 which is movable between a position closing the exit opening 4 and a position releasing the exit opening 4 and a supply channel 8 for a medium, such as air, under pressure, leading through the piston 5 to a side of the piston 5 facing the exit opening, for bringing the hollow space 3 under medium pressure. A part of the piston 5 is substantially form-fitting with a wall part 9 of the space 3. FIG. 2 shows the situation wherein the piston 5 is in the ejected position adjacent to the exit opening 4. The valve 7 is formed by a slide that is movable in the plane P in which the exit opening 4 extends.

Figure 3A:
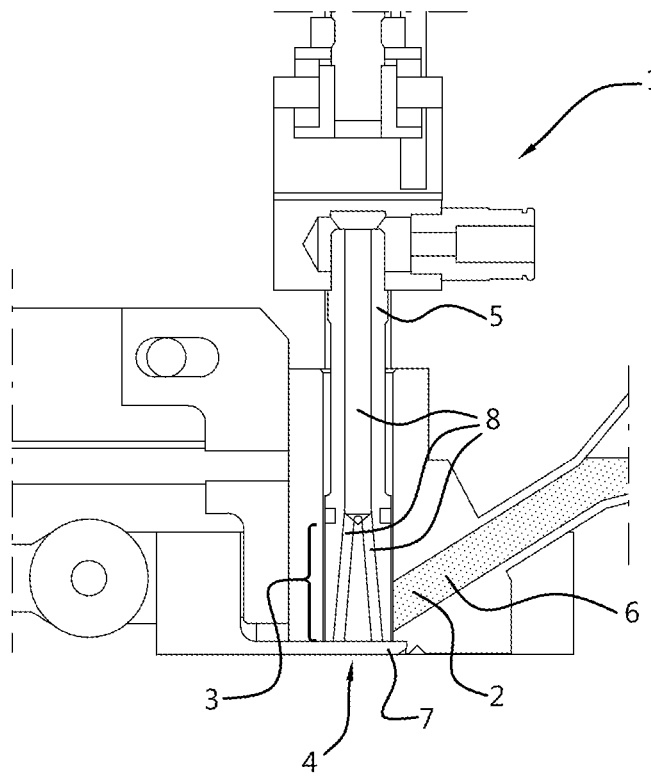
Figure 3B:
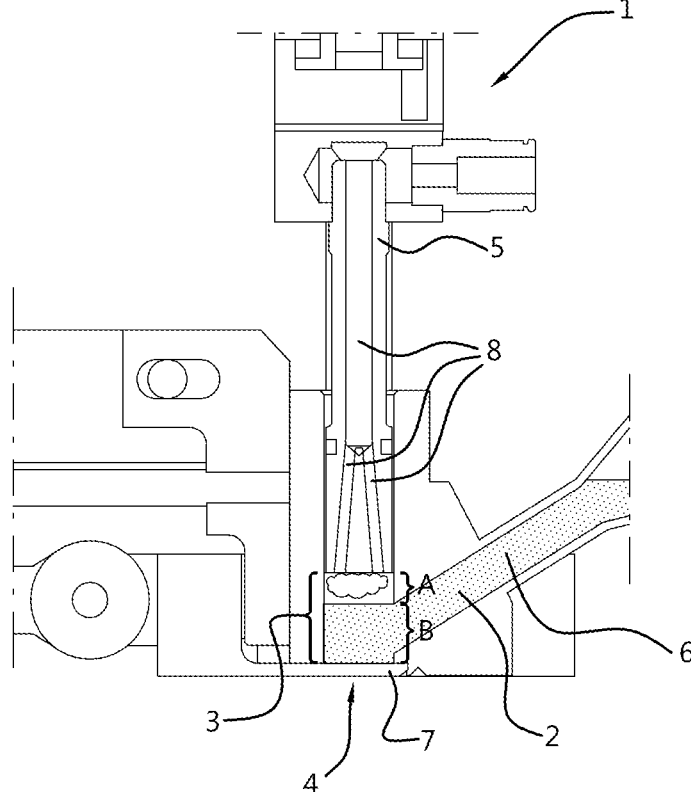
Figure 3C:
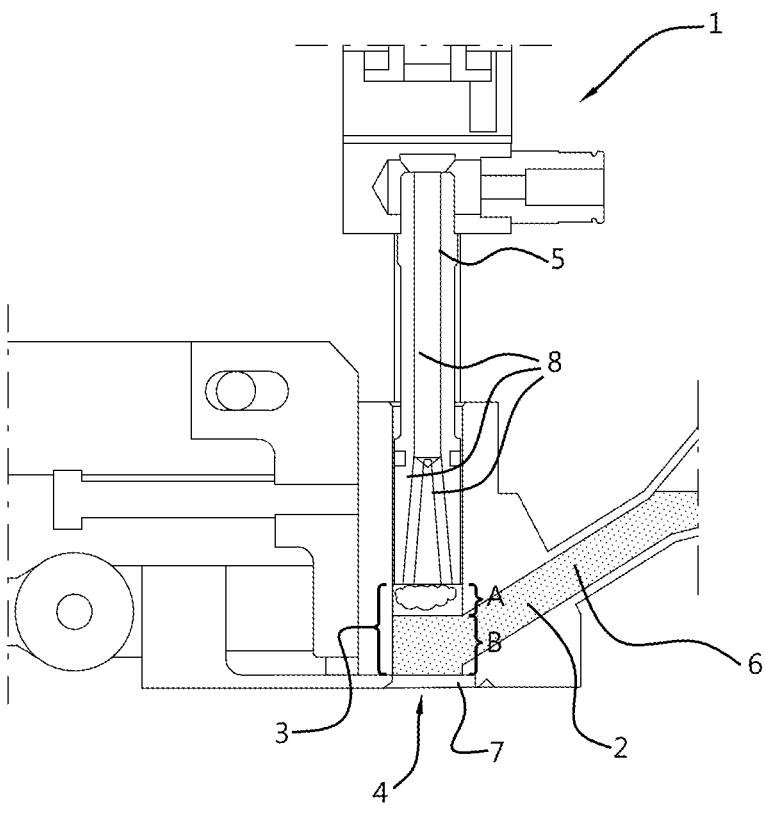

FIG. 3a shows a first stage, wherein the piston 5 is positioned in the ejected position. The valve 7 is in the position closing the exit opening 4. The hollow space 3 is fully occupied by the piston. As a first step, the piston 5 is moved into the retracted position. This stage is shown in FIG. 3b. After that is done, simultaneously a medium, in particular a gas, such as air, is applied through the supply channel 8 and a portion of kneadable mass 2 is supplied to the hollow space 3 via the mass supply channel 6. As a next step, the valve 7 is brought into the position releasing the exit opening, shown in FIG. 3c.

Both FIG. 3 b and FIG. 3 c show the extent to which the piston 5 in its retracted position is spaced from the mass supply channel 6, such that a part A of the closed space 3 extending between the mass supply channel and a part of the piston forming a boundary of the space is about 50% of the volume of the remainder B of the closed space 3.

Figure 3D:
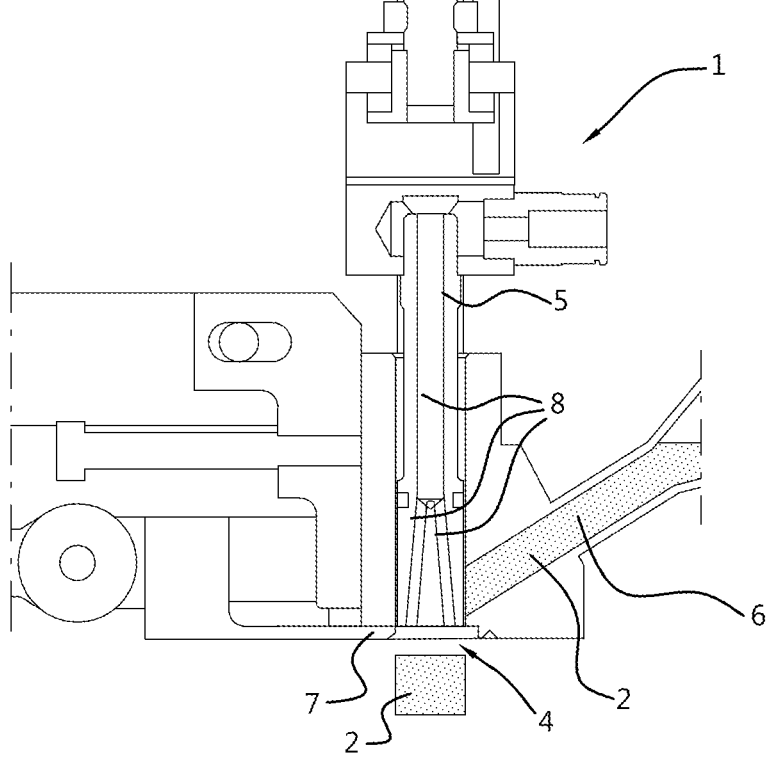

FIG. 3d shows how the piston is finally moved to the ejected position, discharging the malleable mass 2. From this stage it may return to the stage shown in FIG. 3a again.

The above figures are examples only and in no sense meant to limit the scope of the present invention as defined in the following claims.

The invention claimed is:

1. Device for applying a preformed portioned malleable mass, comprising:
a hollow space, provided with at least one closable exit;
a piston that can be moved back and forth in at least a part of the hollow space with at least a directional component from and to the at least one closable exit and in a direction directed from and towards the at least one closable exit, said piston is movable in between at least:
a retracted position in which the piston does not occupy the hollow space; and
an ejected position in which the hollow space is fully occupied;
a mass supply channel operably connected to the hollow space, and configured to deliver the preformed portioned malleable mass into said hollow space when said hollow space is not occupied by the piston,
a valve for the closable exit which is movable between a closed position and an open position, configured to allow the preformed portioned malleable mass to exit the hollow space;
a supply channel for air, under pressure, leading through the piston to a side of the piston facing the exit, for bringing the hollow space under air pressure, wherein the piston is spaced from the mass supply channel in the retracted position; and
the piston in the ejected position is adjacent to the exit;
and wherein the device comprises a controller configured for performing the following steps in sequence:
a. Closing the valve and preventing the preformed portioned malleable mass from exiting the hollow space;
b. Positioning the piston into the retracted position;
c. Applying air, through the supply channel;
d. Supplying a portion of malleable mass to the hollow space via the mass supply channel;
e. Opening the valve and allowing the preformed portioned malleable mass to exit the hollow space;
f. Moving the piston to the ejected position.

2. Device according to claim 1, wherein at least a part of the piston is substantially form-fitting with a wall part of the space.

3. Device according to claim 1, wherein the valve is formed by a slide, in particular a slide that is movable in the plane in which the exit extends.

4. Device according to claim 1, wherein the medium air is applied under a superatmospheric pressure.

5. Device according to claim 1, wherein steps c and d take place at least partly simultaneously.

6. Device according to claim 1, wherein steps c and f take place at least partly simultaneously.

7. Device according to claim 1, further configured for repeating steps a to f.

8. Method for applying a preformed portioned malleable mass, the method comprising the steps of:
Supplying the preformed portioned malleable mass to a hollow space, the hollow space being provided with at least one closable exit, the closable exit having a valve which is movable between a closed position and an open position, wherein the valve is in the closed position;
Applying air to the hollow space, such that a first side of the hollow space is filled with the portioned malleable mass and a second side of the hollow space is filled with the air;
Opening the valve of the closable exit of the hollow space at the first side where the portioned malleable mass is located;
Pushing the portioned malleable mass out of the hollow space in a direction from the second side to the first side, while still applying the air from the second side, wherein the step of pushing takes place contactless where the air is applied to the malleable mass from a piston head end thereby preventing the malleable mass from touching the piston.

* * * * *